US011607775B2

(12) United States Patent
Hanschen et al.

(10) Patent No.: US 11,607,775 B2
(45) Date of Patent: *Mar. 21, 2023

(54) COATED ABRASIVE DISC AND METHODS OF MAKING AND USING THE SAME

(71) Applicant: 3M INNOVATIVE PROPERTIES COMPANY, St. Paul, MN (US)

(72) Inventors: Thomas P. Hanschen, Mendota Heights, MN (US); Steven J. Keipert, Houlton, WI (US); Joseph B. Eckel, Vadnais Heights, MN (US); Aaron K. Nienaber, Maplewood, MN (US); Erin D. Spring, Darien Center, NY (US); Brant A. Moegenburg, Baldwin, MN (US); Eric M. Moore, Roseville, MN (US); Thomas J. Nelson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 488 days.

This patent is subject to a terminal disclaimer.

(21) Appl. No.: 16/763,104

(22) PCT Filed: Nov. 16, 2018

(86) PCT No.: PCT/IB2018/059065
§ 371 (c)(1),
(2) Date: May 11, 2020

(87) PCT Pub. No.: WO2019/102331
PCT Pub. Date: May 31, 2019

(65) Prior Publication Data
US 2020/0346322 A1 Nov. 5, 2020

Related U.S. Application Data

(60) Provisional application No. 62/589,248, filed on Nov. 21, 2017.

(51) Int. Cl.
*B24D 3/28* (2006.01)
*B24D 11/02* (2006.01)

(52) U.S. Cl.
CPC ............... *B24D 3/28* (2013.01); *B24D 11/02* (2013.01); *B24D 2203/00* (2013.01)

(58) Field of Classification Search
None
See application file for complete search history.

(56) References Cited

U.S. PATENT DOCUMENTS

| 1,910,444 A | 5/1933 | Nicholson |
| 3,041,156 A | 6/1962 | Rowse |

(Continued)

FOREIGN PATENT DOCUMENTS

| CN | 85202722 U | 4/1986 |
| CN | 2180670 Y | 10/1994 |

(Continued)

OTHER PUBLICATIONS

International Search Report for PCT International Application No. PCT/IB2018/059065, dated Feb. 13, 2019, 3 pages.

(Continued)

*Primary Examiner* — Pegah Parvini
*Assistant Examiner* — Ross J Christie
(74) *Attorney, Agent, or Firm* — Katherine M. Scholz

(57) ABSTRACT

A coated abrasive disc includes a disc backing having an outer circumference. An abrasive layer is disposed on the disc backing. The abrasive layer comprises triangular abrasive platelets secured to a major surface of the disc backing by at least one binder material. The triangular abrasive platelets are outwardly disposed at regularly-spaced points along a spiral pattern extending outwardly toward the outer circumference. Each triangular abrasive platelet has respective top and bottom surfaces connected to each other, and (Continued)

separated by, three sidewalls. On a respective basis, one sidewall of at least 90 percent of the triangular abrasive platelets is disposed facing and proximate to the disc backing, and at least 70 percent of the triangular abrasive platelets are disposed in a recurring sequential orientation having an oscillating Z-axis rotational orientation of the first respective sidewall relative to the tangents to the spiral pattern at regularly-spaced points. Methods of making and using the coated abrasive disc are also disclosed.

13 Claims, 8 Drawing Sheets

(56) References Cited

U.S. PATENT DOCUMENTS

| | | |
|---|---|---|
| 3,716,950 A | 2/1973 | McClure |
| 3,991,527 A | 11/1976 | Maran |
| 4,062,153 A | 12/1977 | Malm |
| 4,314,827 A | 2/1982 | Leitheiser |
| 4,615,151 A | 10/1986 | Huber |
| 4,623,364 A | 11/1986 | Cottringer |
| 4,652,275 A | 3/1987 | Bloecher |
| 4,734,104 A | 3/1988 | Broberg |
| 4,737,163 A | 4/1988 | Larkey |
| 4,744,802 A | 5/1988 | Schwabel |
| 4,751,138 A | 6/1988 | Tumey |
| 4,770,671 A | 9/1988 | Monroe |
| 4,799,939 A | 1/1989 | Bloecher |
| 4,881,951 A | 11/1989 | Wood |
| 4,997,461 A | 3/1991 | Markhoff-Matheny |
| 5,009,675 A | 4/1991 | Kunz |
| 5,011,508 A | 4/1991 | Wald |
| 5,014,468 A | 5/1991 | Ravipati |
| 5,042,991 A | 8/1991 | Kunz |
| 5,085,671 A | 2/1992 | Martin |
| 5,092,082 A | 3/1992 | Padberg |
| 5,152,917 A | 10/1992 | Pieper |
| 5,201,916 A | 4/1993 | Berg |
| 5,203,884 A | 4/1993 | Buchanan |
| 5,213,591 A | 5/1993 | Celikkaya |
| 5,352,254 A | 10/1994 | Celikkaya |
| 5,366,523 A | 11/1994 | Rowenhorst |
| 5,378,251 A | 1/1995 | Culler |
| 5,417,726 A | 5/1995 | Stout |
| 5,435,816 A | 7/1995 | Spurgeon |
| 5,436,063 A | 7/1995 | Follett |
| 5,496,386 A | 3/1996 | Broberg |
| 5,520,711 A | 5/1996 | Helmin |
| 5,556,437 A | 9/1996 | Lee |
| 5,609,706 A | 3/1997 | Benedict |
| 5,672,097 A | 9/1997 | Hoopman |
| 5,697,359 A | 12/1997 | Okanishi |
| 5,766,277 A | 6/1998 | DeVoe |
| 5,833,724 A | 11/1998 | Wei |
| 5,946,991 A | 9/1999 | Hoopman |
| 5,954,844 A | 9/1999 | Law |
| 5,961,674 A | 10/1999 | Gagliardi |
| 5,975,987 A | 11/1999 | Hoopman |
| 5,975,988 A | 11/1999 | Christianson |
| 5,984,988 A | 11/1999 | Berg |
| 6,077,601 A | 6/2000 | DeVoe |
| 6,129,540 A | 10/2000 | Hoopman |
| 6,139,411 A | 10/2000 | Everts |
| 6,228,133 B1 | 5/2001 | Thurber |
| 6,257,973 B1 | 7/2001 | Fernand Guiselin |
| 6,413,286 B1 | 7/2002 | Swei |
| 6,511,713 B2 | 1/2003 | Mathisen |
| 6,526,959 B1 | 3/2003 | Lee |
| 6,537,140 B1 | 3/2003 | Miller |
| 7,524,345 B2 | 4/2009 | Nevoret |
| 8,142,531 B2 | 3/2012 | Adefris |
| 8,142,532 B2 | 3/2012 | Erickson |
| 8,142,891 B2 | 3/2012 | Culler |
| 8,956,203 B2 | 2/2015 | Zhang |
| 8,961,269 B2 | 2/2015 | Zhang |
| 9,200,187 B2 | 12/2015 | Bauer |
| 9,457,453 B2 | 10/2016 | Seth |
| 9,776,302 B2 | 10/2017 | Keipert |
| D849,066 S | 5/2019 | Hanschen |
| D849,067 S | 5/2019 | Hanschen |
| D862,538 S | 10/2019 | Hanschen |
| D870,782 S | 12/2019 | Hanschen |
| D879,164 S | 3/2020 | Hanschen |
| 2002/0081957 A1 | 6/2002 | Cisneros |
| 2005/0060941 A1 | 3/2005 | Provow |
| 2007/0232200 A1 | 10/2007 | Natsui |
| 2009/0165394 A1 | 7/2009 | Culler |
| 2009/0169816 A1 | 7/2009 | Erickson |
| 2009/0215366 A1 | 8/2009 | Ishizuka |
| 2012/0227333 A1 | 9/2012 | Adefris |
| 2013/0040537 A1 | 2/2013 | Schwabel |
| 2013/0125477 A1 | 5/2013 | Adefris |
| 2013/0344786 A1 | 12/2013 | Keipert |
| 2014/0106126 A1 | 4/2014 | Gaeta et al. |
| 2015/0004889 A1 | 1/2015 | Seth |
| 2015/0343603 A1 | 12/2015 | Breder |
| 2016/0068729 A1 | 3/2016 | Erickson |
| 2016/0289521 A1 | 10/2016 | Colet |
| 2016/0311084 A1 | 10/2016 | Culler |
| 2017/0225299 A1 | 8/2017 | Keipert |
| 2017/0252898 A1 | 9/2017 | Schillo-Armstrong |

FOREIGN PATENT DOCUMENTS

| | | |
|---|---|---|
| CN | 2280585 U | 5/1998 |
| CN | 201179626 U | 1/2009 |
| CN | 201519910 U | 7/2010 |
| CN | 103056751 A | 4/2013 |
| CN | 203577871 U | 5/2014 |
| CN | 203650283 U | 6/2014 |
| CN | 104209842 A | 12/2014 |
| CN | 204639958 U | 9/2015 |
| CN | 204686640 U | 10/2015 |
| EP | 1011924 | 6/2000 |
| EP | 1868770 | 12/2007 |
| JP | 02224977 | 9/1990 |
| JP | 04093179 | 3/1992 |
| JP | 04111778 | 4/1992 |
| JP | 07060650 | 3/1995 |
| JP | 3135090 | 2/2001 |
| JP | 3733302 | 10/2005 |
| JP | 4248167 | 1/2009 |
| JP | 2014-508652 | 4/2014 |
| JP | 2015-532218 | 11/2015 |
| JP | 2017-007088 | 1/2017 |
| KR | 100813769 | 3/2008 |
| WO | 9304819 A1 | 3/1993 |
| WO | WO 2012/112305 | 8/2012 |
| WO | 2013102206 A1 | 7/2013 |
| WO | 2014062701 A1 | 4/2014 |
| WO | WO 2015-100018 | 7/2015 |
| WO | WO 2016-028683 | 2/2016 |
| WO | WO 2019-102328 | 5/2019 |
| WO | WO 2019-102329 | 5/2019 |
| WO | WO 2019-102330 | 5/2019 |
| WO | WO 2019-102332 | 5/2019 |

OTHER PUBLICATIONS

Co-pending U.S. Appl. No. 16/650,147, filed Nov. 16, 2020, entitled "Coated Abrasive Disc and Methods of Making and Using the Same".

Co-pending U.S. Appl. No. 16/763,005, filed Nov. 16, 2020, entitled "Coated Abrasive Disc and Methods of Making and Using the Same".

Co-pending U.S. Appl. No. 16/763,130, filed Nov. 16, 2020, entitled "Coated Abrasive Disc and Methods of Making and Using the Same".

Co-pending U.S. Appl. No. 16/763,064, filed Nov. 16, 2020, entitled "Coated Abrasive Disc and Methods of Making and Using the Same".

COATED ABRASIVE DISC AND METHODS OF MAKING AND USING THE SAME

TECHNICAL FIELD

The present disclosure broadly relates to coated abrasive discs, methods of making them, and methods of using them.

BACKGROUND

Coated abrasive discs made from triangular abrasive platelets are useful for abrading, finishing, or grinding a wide variety of materials and surfaces in the manufacturing of goods. In particular, high-pressure off-hand grinding of high carbon steel by off-hand abrading with a handheld right-angle grinder is an important application for coated abrasive discs. In view of the above, there continues to be a need for improving the cost, performance, and/or life of the coated abrasive discs.

Coated abrasive articles having rotationally aligned triangular abrasive platelets are disclosed in U.S. Pat. No. 9,776,302 (Keipert). The coated abrasive articles have a plurality of triangular abrasive platelets each having a surface feature. The plurality of triangular abrasive platelets is attached to a flexible backing by a make coat comprising a resinous adhesive forming an abrasive layer. The surface features have a specified z-direction rotational orientation that occurs more frequently in the abrasive layer than would occur by a random z-direction rotational orientation of the surface feature.

SUMMARY

In one aspect, the present disclosure provides a coated abrasive disc comprising:

a disc backing having an outer circumference;

an abrasive layer disposed on the disc backing, wherein the abrasive layer comprises triangular abrasive platelets secured to a major surface of the disc backing by at least one binder material, wherein the triangular abrasive platelets are outwardly disposed at regularly-spaced points along a spiral pattern extending outwardly toward the outer circumference, wherein each one of the triangular abrasive platelets has respective top and bottom surfaces connected to each other, and separated by, three sidewalls, wherein, on a respective basis, one sidewall of at least 90 percent of the triangular abrasive platelets is disposed facing and proximate to the disc backing, and wherein at least 70 percent of the triangular abrasive platelets are disposed in a recurring sequential orientation having:

i) a first triangular abrasive platelet with a first respective sidewall facing, the disc hacking, wherein the Z-axis rotational orientation of the first respective sidewall is longitudinally outwardly oriented at an angle of −10 to −40 degrees relative to the tangent to the spiral pattern at a first one of the regularly-spaced points;

ii) a second triangular abrasive platelet with a second respective sidewall facing the disc backing, wherein the Z-axis rotational orientation of the second respective sidewall is longitudinally outwardly oriented at an angle of −15 to +15 degrees relative to the tangent to the spiral pattern at a second one of the regularly-spaced points;

iii) a third triangular abrasive platelet with a third respective sidewall facing the disc backing, wherein the Z-axis rotational orientation of the third respective sidewall is longitudinally outwardly oriented at an angle of +10 to +40 degrees relative to the tangent to the spiral pattern at a third one of the regularly-spaced points; and iv) a fourth triangular abrasive platelet with a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth one of the regularly-spaced points.

Advantageously, coated abrasive discs according to the present disclosure are useful for high-pressure off-hand abrading of high carbon steel, where they exhibit superior performance as compared to previous similar discs.

Accordingly, in a second aspect, the present disclosure provides a method of abrading a workpiece, the method comprising frictionally contacting a portion of the abrasive layer of a coated abrasive disc according to the present disclosure with a workpiece, and moving at least one of the workpiece and the coated abrasive disc relative to the other to abrade the workpiece.

In a third aspect, the present disclosure provides a method of making a coated abrasive disc, the method comprising:

disposing a curable make layer precursor on a major surface of a disc backing;

embedding triangular abrasive platelets into the curable make layer precursor, wherein the triangular abrasive platelets are outwardly disposed at regularly-spaced points along an spiral pattern extending outwardly toward the outer circumference, wherein each one of the triangular abrasive platelets has respective top and bottom surfaces connected to each other, and separated by, three sidewalls, wherein, on a respective basis, one sidewall of at least 90 percent of the triangular abrasive platelets is disposed facing and proximate to the disc backing, and wherein at least 70 percent of the triangular abrasive platelets are disposed in a recurring sequential orientation having:

i) a first triangular abrasive platelet with a first respective sidewall facing, the disc backing, wherein the Z-axis rotational orientation of the first respective sidewall is longitudinally outwardly oriented at an angle of −10 to −40 degrees relative to the tangent to the spiral pattern at a first one of the regularly-spaced points;

ii) a second triangular abrasive platelet with a second respective sidewall facing the disc backing, wherein the Z-axis rotational orientation of die second respective sidewall is longitudinally outwardly oriented at an angle of −15 to +15 degrees relative to the tangent to the spiral pattern at a second one of the regularly-spaced points;

iii) a third triangular abrasive platelet with a third respective sidewall facing the disc backing, wherein the Z-axis rotational orientation of the third respective sidewall is longitudinally outwardly oriented at an angle of +10 to +40 degrees relative to the tangent to the spiral pattern at a third one of the regularly-spaced points; and iv) a fourth triangular abrasive platelet with a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth one of the regularly-spaced points;

at least partially curing the curable make layer precursor to provide a make layer;

disposing a curable size layer precursor over the make layer and triangular abrasive platelets; and at least partially curing the curable size layer precursor to provide a size layer.

As used herein:

The term "mild steel" refers to a carbon-based steel alloy containing less than about 0.25 percent by weight of carbon.

The term "offhand abrading" means abrading where the operator manually, urges the disc/wheel against a workpiece or vice versa.

The term "proximate" means very near or next to (e.g., contacting or embedded in a binder layer contacting).

The term "spiral" refers to a spiral which is planar. In some preferred embodiments, the spiral may be an arithmetic spiral, also known as an "Archimedean spiral". An arithmetic spiral has the property that any ray from the origin intersects successive turnings of the spiral in points with a constant separation distance.

The term "workpiece" refers to a thing being abraded.

As used herein, the term "triangular abrasive platelet", means a ceramic abrasive particle with at least a portion of the abrasive particle having a predetermined shape that is replicated from a mold cavity used to form the shaped precursor abrasive particle. Except in the case of abrasive shards (e.g., as described in U. S. Pat. Appl. Publ. 2009/0169816 A1 (Erickson et al.), the triangular abrasive platelet will generally have a predetermined geometric shape that substantially replicates the mold cavity that was used to form the triangular abrasive platelet. Triangular abrasive platelet as used herein excludes randomly sized abrasive particles obtained by a mechanical crushing operation.

As used herein, "Z-axis rotational orientation" refers to the angular rotation, about a Z-axis perpendicular to the major surface of the disc backing, of the longitudinal dimension the triangular abrasive platelet sidewall that most faces the disc backing.

Features and advantages of the present disclosure will be further understood upon consideration of the detailed description as well as the appended claims.

BRIEF DESCRIPTION OF THE DRAWINGS

FIG. 2A is a schematic top view of exemplary triangular abrasive platelet 130a.

FIG. 2B is a schematic perspective view of exemplary triangular abrasive platelet 130a.

Figure 1:
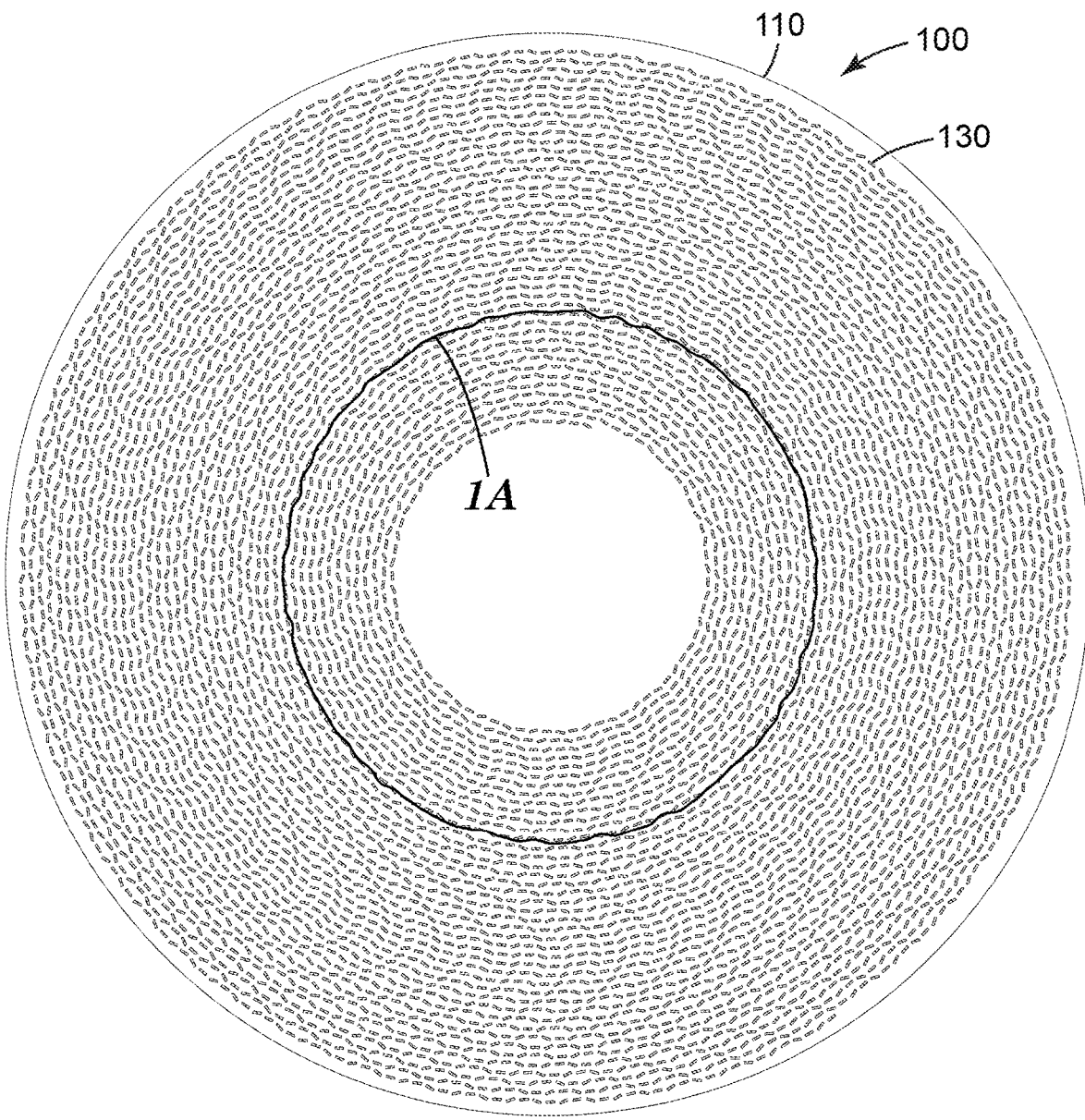
FIG. 1 is a schematic top view of exemplary coated abrasive disc 100.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

FIG. 1 shows an exemplary coated abrasive disc 100 according to the present disclosure, wherein triangular abrasive platelets 130 are secured at precise locations and Z-axis orientations to a disc backing 110.

Figure 1A:
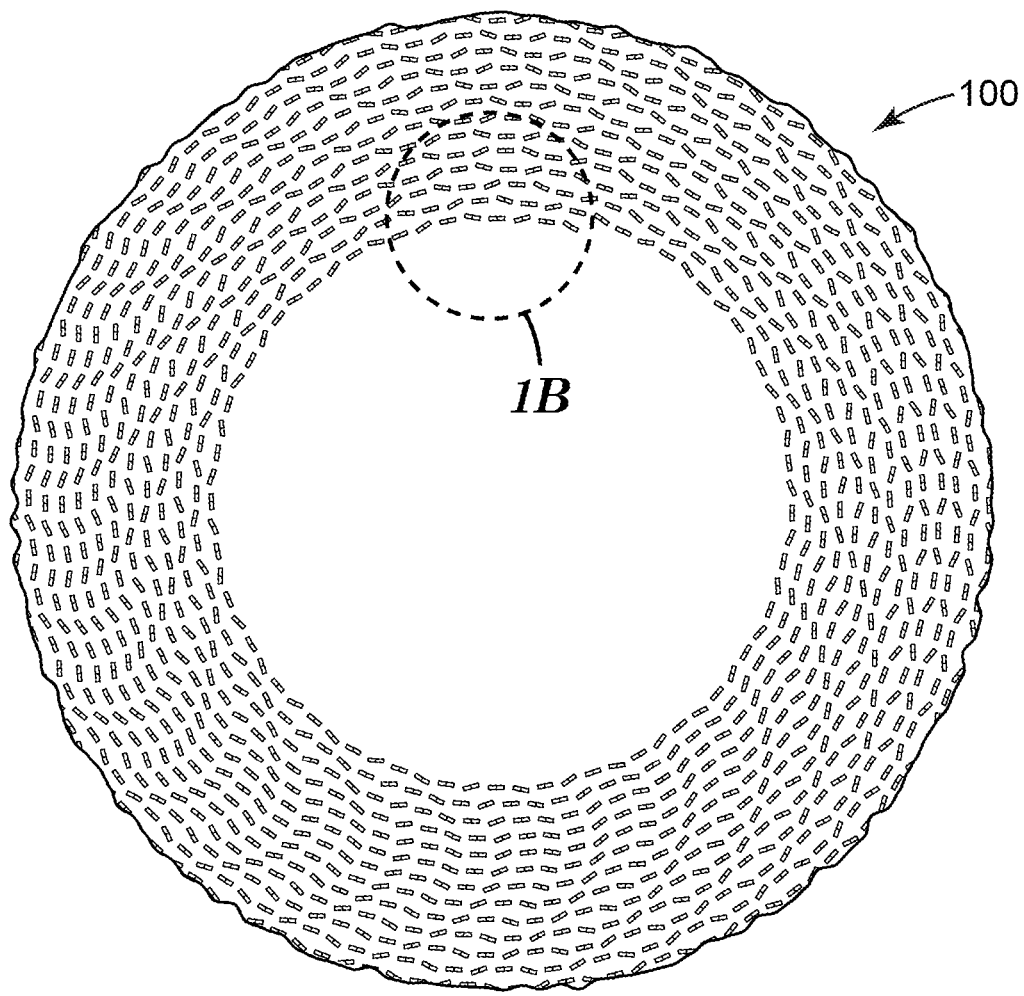
FIG. 1A is an enlarged view of region 1A in FIG. 1.
Figure 1B:
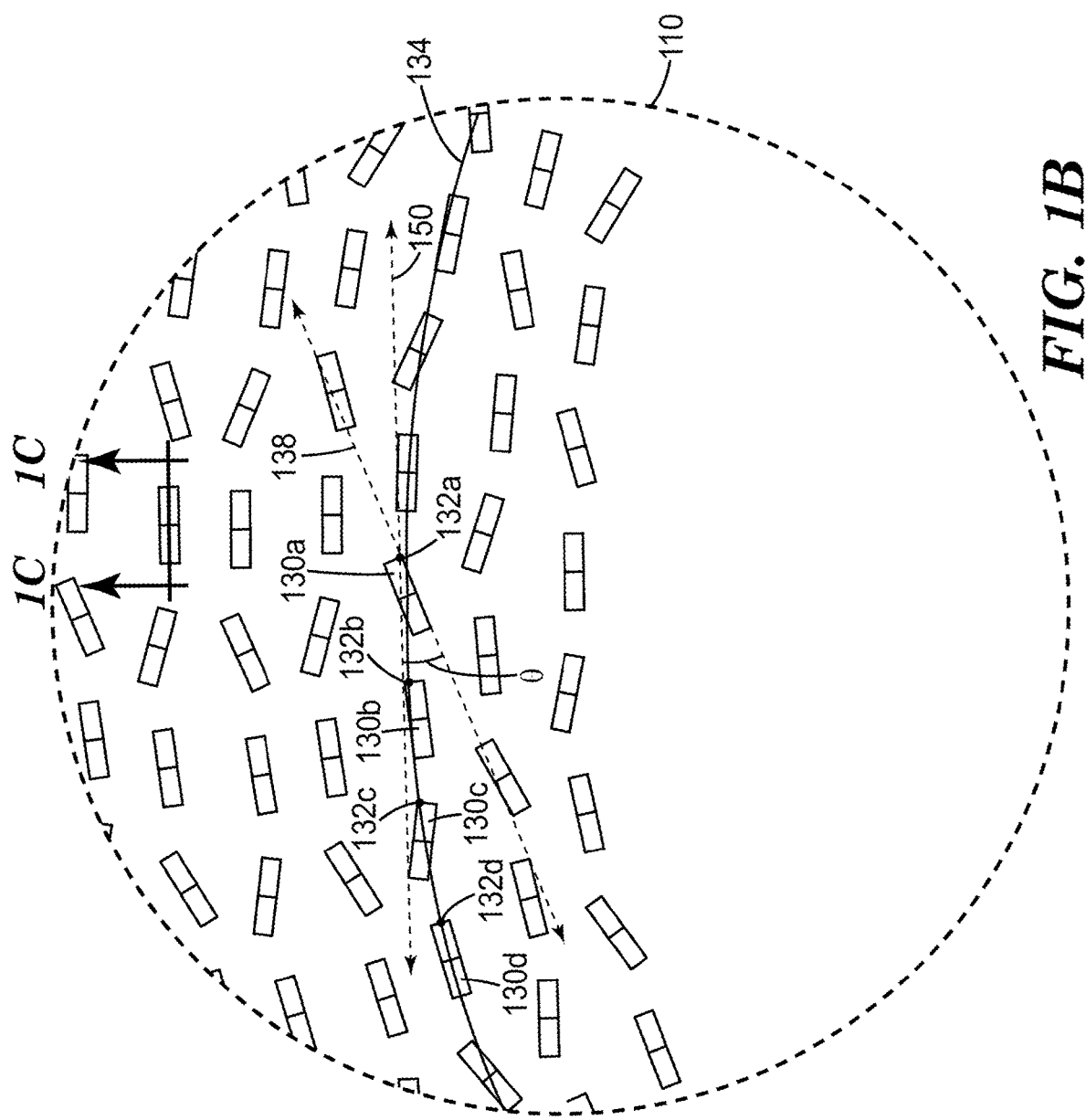
FIG. 1B is an enlarged view of region 1B in FIG. 1A.
Figure 1C:
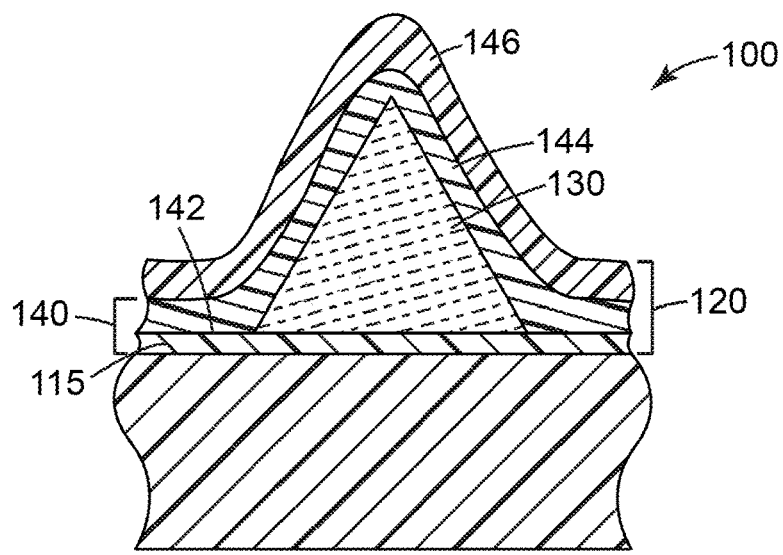
FIG. 1C is a schematic cross-sectional view of coated abrasive disc 100 taken along line 1C-1C in FIG. 1B.

Referring now to FIGS. 1A and 1B, abrasive layer 120 disposed on a major surface 115 of disc backing 110. Abrasive layer 120 comprises triangular abrasive platelets 130 secured to major surface 115 of disc backing 110 by at least one binder material 140 (shown as make layer 132 and size layer 134). Triangular abrasive platelets 130 are disposed at regularly-spaced points 132 along an arithmetic spiral pattern 134 extending radially outward toward outer circumference 140. On a respective basis, one sidewall of at least 90 percent of the triangular abrasive platelets 130 is disposed facing and proximate to the disc backing.

At least 70 percent of the triangular abrasive platelets 130 are disposed in a recurring sequential orientation that includes four regularly spaced sequential triangular platelets 130.

The first triangular abrasive platelet 130a has a first respective sidewall 136a facing the disc backing 110. The Z-axis rotational orientation 138 of the first respective sidewall is longitudinally outwardly oriented at an angle of −10 to −40 degrees relative to the tangent 150 to the spiral pattern 134 at a first point 132. For clarity, the determination of Z-axis orientation is shown only for triangular abrasive platelet 130a. Z-axis orientation is determined in an analogous manner for the remaining three triangular abrasive platelets.

The second triangular abrasive platelet 130b has a second respective sidewall facing the disc backing, wherein the Z-axis rotational orientation of the second respective sidewall is longitudinally outwardly oriented at an angle of −15 to ±15 degrees relative to the tangent to the spiral pattern at a second point 132b.

The third triangular abrasive platelet 130c has with a third respective sidewall facing, the disc backing, wherein the Z-axis rotational orientation of the third respective sidewall is longitudinally outwardly oriented at an angle of +10 to +40 degrees relative to the tangent to the spiral pattern at a third point 132c.

The fourth triangular abrasive platelet 130d has a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth point 132d.

As used herein, the horizontal Z-axis rotational direction is considered to be θ degrees relative to a tangent at a point on the spiral pattern if its Z-axis projection onto the arithmetic spiral pattern 140 (which is planar) intersects the tangent line at an angle of θ degrees. For collinear and parallel configurations θ=0 degrees.

Figure 2A:
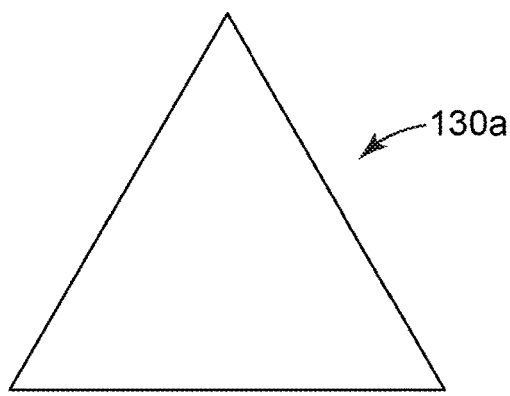
Figure 2B:
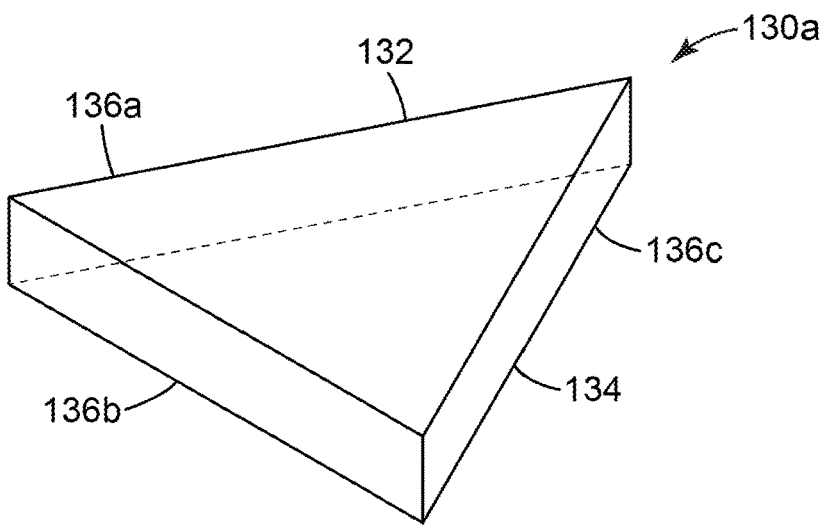

In this regard, the horizontal Z-axis rotational direction is considered to be within 10 degrees of the tangent at a point on the spiral pattern if its Z-axis projection onto the arithmetic spiral pattern 140 (which is planar) intersects the tangent line at an angle of 10 degrees or less Referring now to FIGS. 2A and 2B, each triangular abrasive platelet 130 has respective top and bottom surfaces (132, 134) connected to each other, and separated by, three sidewalls (136).

Figure 3A:
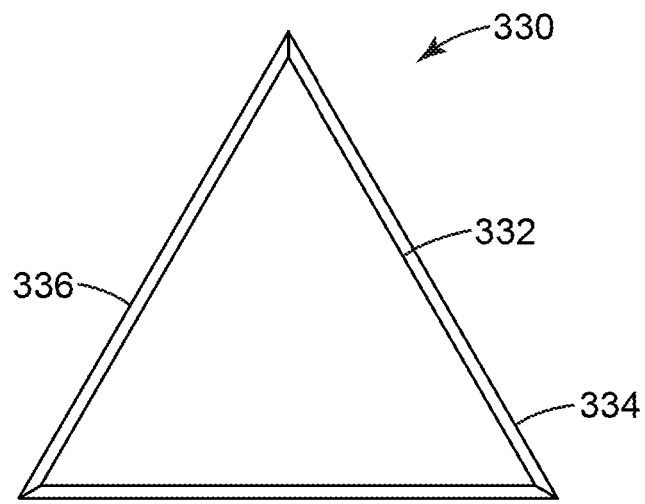
FIG. 3A is a schematic top view of exemplary triangular abrasive platelet 330.
Figure 3B:
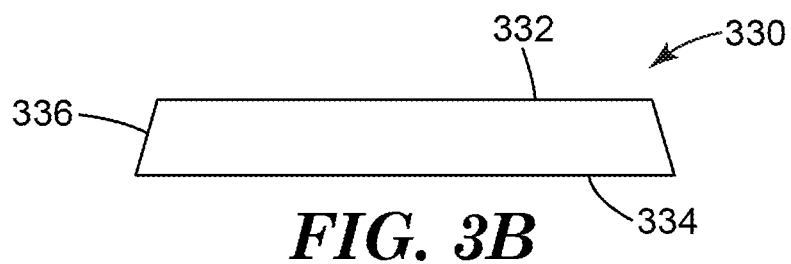
FIG. 3B is a schematic side view of exemplary triangular abrasive platelet 330b.

FIGS. 3A and 3B show another embodiment of a useful triangular abrasive platelets 330, triangular abrasive platelet 330 has respective top and bottom surfaces (332, 334) connected to each other, and separated by, three sloping sidewalls (336).

The disc backing may comprise any known coated abrasive backing, for example. In some embodiments, the disc backing comprises a continuous uninterrupted disc, while in others it may have a central arbor hole for mounting. Likewise, the disc backing may be flat or it may have a depressed central hub, for example, a Type 27 depressed center disc. The disc backing may be rigid, semi-rigid, or flexible. In some embodiments, the backing has a mechanical fastener, or adhesive fastener securely attached to a major surface opposite the abrasive layer. Suitable materials for the substrate include polymeric films, metal foils, woven fabrics, knitted fabrics, paper, vulcanized fiber, nonwovens, foams, screens, laminates, combinations thereof, and treated versions thereof. For off-hand grinding applications where stiffness and cost are concerns, vulcanized fiber backings are typically preferred. For applications where stiffness of the backing is desired, a flexible backing may also be used by affixing it to a rigid backup pad mounted to the grinding tool.

The disc backing is generally circular and preferably rotationally symmetric around its center. Preferably it has a circular perimeter, but it may have additional features along the perimeter such as, for example, in the case of a scalloped perimeter.

The abrasive layer may comprise a single binder layer having abrasive particles retained therein, or more typically, a multilayer construction having make and size layers. Coated abrasive discs according to the present disclosure may include additional layers such as, for example, an optional supersize layer that is superimposed on the abrasive layer, or a backing antistatic treatment layer may also be included, if desired. Exemplary suitable binders can be prepared from thermally curable resins, radiation-curable resins, and combinations thereof.

The make layer can be formed by coating a curable make layer precursor onto a major surface of the backing. The make layer precursor may comprise, for example, glue, phenolic resin, aminoplast resin, urea-formaldehyde resin, melamine-formaldehyde resin, urethane resin, free-radically polymerizable polyfunctional (meth)acrylate (e.g., aminoplast resin having pendant α,β-unsaturated groups, acrylated urethane, acrylated epoxy, acrylated isocyanurate), epoxy resin (including bis-maleimide and fluorene-modified epoxy resins), isocyanurate resin, and mixtures thereof. Of these, phenolic resins are preferred, especially when used in combination with a vulcanized fiber backing.

Phenolic resins are generally formed by condensation of phenol and formaldehyde, and are usually categorized as resole or novolac phenolic resins. Novolac phenolic resins are acid-catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used. If the solids content is very low, then more energy is required to remove the water and/or solvent. If the solids content is very high, then the viscosity of the resulting phenolic resin is too high which typically leads to processing problems.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

The make layer precursor may be applied by any known coating method for applying a make layer to a hacking such as, for example, including roll coating, extrusion die coating, curtain coating, knife coating, gravure coating, and spray coating.

The basis weight of the make layer utilized may depend, for example, on the intended use(s), type(s) of abrasive particles, and nature of the coated abrasive disc being prepared, but typically will be in the range of from 1, 2, 5, 10, or 15 grams per square meter (gsm) to 20, 25, 100, 200, 300, 400, or even 600 gsm. The make layer may be applied by any known coating method for applying a make layer (e.g., a make coat) to a backing, including, for example, roll coating, extrusion die coating, curtain coating, knife coating, gravure coating, and spray coating.

Once the make layer precursor is coated on the backing, the triangular abrasive platelets are applied to and embedded in die make layer precursor. The triangular abrasive platelets are applied nominally according to a predetermined pattern and Z-axis rotational orientation onto the make layer precursor.

The triangular abrasive platelets are outwardly disposed from the disc backing (i.e., they extend away from the disc backing). As used herein the term "outwardly disposed" means that the triangular abrasive platelets extend away from the disc backing, typically forming a dihedral angle of from 45 to 90 degrees, preferably from 60 to 90 degrees, and more preferably from 75 to 90 degrees, relative to the nearest surface of the backing.

In some preferred embodiments, the spacing between the respective points on the spiral pattern is from 1.0 to 3 times, more preferably 1.2 to 2 times, and even more preferably 1.2 to 1.7 times the average length of the sidewalls of the triangular abrasive platelets that are facing the fiber disc backing, although other spacings may also be used.

In some embodiments, the triangular abrasive platelets are shaped as thin triangular prisms, while in other embodiments, the triangular abrasive platelets are shaped as truncated triangular pyramids (preferably with a taper angle of about 8 degrees). The triangular abrasive platelets may have different side lengths, but are preferably equilateral on their largest face.

The triangular abrasive platelets have sufficient hardness to function as abrasive particles in abrading processes.

Preferably, the triangular abrasive platelets have a Mohs hardness of at least 4, at least 5, at least 6, at least 7, or even at least 8. Preferably, they comprise alpha alumina.

Crushed abrasive or non-abrasive particles may be included in the abrasive layer between the abrasive elements and/or abrasive platelets, preferably in sufficient quantity to form a closed coat (i.e., substantially the maximum possible number of abrasive particles of nominal specified grade(s) that can be retained in the abrasive layer).

Examples of suitable abrasive particles include: fused aluminum oxide; heat-treated aluminum oxide; white fused aluminum oxide; ceramic aluminum oxide materials such as those commercially available under the trade designation 3M CERAMIC ABRASIVE GRAIN from 3M Company, St. Paul, Minn.; brown aluminum oxide; blue aluminum oxide; silicon carbide (including green silicon carbide); titanium dibotide; boron carbide; tungsten carbide; garnet; titanium carbide; diamond; cubic boron nitride; garnet; fused alumina zirconia; iron oxide; chromia; zirconia; titania; tin oxide; quartz; feldspar; flint; emery; sol-gel-derived abrasive particles; and combinations thereof. Of these, molded sol-gel derived alpha alumina triangular abrasive platelets are preferred in many embodiments. Abrasive material that cannot be processed by a sol-gel route may be molded with a temporary or permanent binder to form shaped precursor particles which are then sintered to form triangular abrasive platelets, for example, as described in U. S. Pat. Appln. Publ, No, 2016/0068729 A1 (Erickson et al.).

Examples of sol-gel-derived abrasive particles and methods for their preparation call be found in U.S. Pat. No. 4,314,827 (Leitheiser et al.); U.S. Pat. No. 4,623,364 (Cottringer et at); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.). In some embodiments, the triangular abrasive platelets may be surface-treated with a coupling agent (e.g., an organosilane coupling agent) or other physical treatment (e.g., iron oxide or titanium oxide) to enhance adhesion of the abrasive particles to the binder (e.g., make and/or size layer). The abrasive particles may be treated before combining them with the corresponding binder precursor, or they may be surface treated in situ by including a coupling agent to the binder.

Preferably, the triangular abrasive platelets comprise ceramic abrasive particles such as, for example, sol-gel-derived polycrystalline alpha alumina particles. Triangular abrasive platelets composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et at) and U. S. Pat. Appln. Publ. Nos. 2009/0165394 A1 (Culler et at) and 2009/0169816 A1 (Erickson et al.).

Alpha alumina-based triangular abrasive platelets can be made according to well-known multistep processes. Briefly, the method comprises the steps of making either a seeded or non-seeded sol-gel alpha alumina precursor dispersion that can be converted into alpha alumina; filling one or more mold cavities having the desired outer shape of the triangular abrasive platelet with the sol-gel, drying the sol-gel to form precursor triangular abrasive platelets; removing the precursor triangular abrasive platelets from the mold cavities; calcining the precursor triangular abrasive platelets to form calcined, precursor triangular abrasive platelets, and then sintering the calcined, precursor triangular abrasive platelets to form triangular abrasive platelets. The process will now be described in greater detail.

Further details concerning methods of making sol-gel-derived abrasive particles call be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et at); and U.S. Pat. No. 6,129,540 (Hoopman et al.); and in U. S. Publ. Pat. Appln. No. 2009/0165394 A1 (Culler et al.).

The triangular abrasive platelets may include a single kind of triangular abrasive platelets or a blend of two or more sizes and/or compositions of triangular abrasive platelets. In some preferred embodiments, the triangular abrasive platelets are precisely-shaped in that individual triangular abrasive platelets will have a shape that is essentially the shape of the portion of the cavity of a mold or production tool in which the particle precursor was dried, prior to optional calcining and sintering.

Triangular abrasive platelets used in the present disclosure can typically be made using tools (i.e., molds) cut using precision machining, which provides higher feature definition than other fabrication alternatives such as, for example, stamping or punching. Typically, the cavities in the tool surface have planar faces that meet along sharp edges, and form the sides and top of a truncated pyramid. The resultant triangular abrasive platelets have a respective nominal average shape that corresponds to the shape of cavities (e.g., truncated pyramid) in the tool surface; however, variations (e.g., random variations) from die nominal average shape may occur during manufacture, and triangular abrasive platelets exhibiting such variations are included within the definition of triangular abrasive platelets as used herein.

In some embodiments, the base and the top of the triangular abrasive platelets are substantially parallel, resulting in prismatic or truncated pyramidal shapes, although this is not a requirement. In some embodiments, the sides of a truncated trigonal pyramid have equal dimensions and form dihedral angles with the base of about 82 degrees. However, it will be recognized that other dihedral angles (including 90 degrees) may also be used. For example, the dihedral angle between the base and each of the sides may independently range from 45 to 90 degrees, typically 70 to 90 degrees, more typically 75 to 85 degrees.

As used herein in referring to triangular abrasive platelets, the term "length" refers to the maximum dimension of a triangular abrasive platelet, "Width" refers to the maximum dimension of the triangular abrasive platelet that is perpendicular to die length. The terms "thickness" or "height" refer to the dimension of the triangular abrasive platelet that is perpendicular to the length and width.

Examples of sol-gel-derived triangular alpha alumina (i.e., ceramic) abrasive particles can be found in U.S. Pat. No. 5,201,916 (Berg); U.S. Pat. No. 5,366,523 (Rowenhorst (Re 35,570)); and U.S. Pat. No. 5,984,988 (Berg). Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U. S. Pat. Appl. Publ. Nos. 2012/0227333 (Adefris et at); 2013/0040537 (Schwabcl et al.); and 2013/0125477 (Adefris).

The triangular abrasive platelets are typically selected to have a length in a range of from 1 micron to 15000 microns, more typically 10 microns to about 10000 microns, and still more typically from 150 to 2600 microns, although other lengths may also be used.

Triangular abrasive platelets are typically selected to have a width in a range of from 0.1 micron to 3500 microns, more typically 100 microns to 3000 microns, and more typically 100 microns to 2600 microns, although other lengths may also be used.

Triangular abrasive platelets are typically selected to have a thickness in a range of from 0.1 micron to 1600 microns, more typically from 1 micron to 1200 microns, although other thicknesses may be used.

In some embodiments, triangular abrasive platelets may have an aspect ratio (length to thickness) of at least 2, 3, 4, 5, 6, or more.

Surface coatings on the triangular abrasive platelets may be used to improve the adhesion between the triangular abrasive platelets and a binder in abrasive discs, or can be used to aid in electrostatic deposition of the triangular abrasive platelets. In one embodiment, surface coatings as described in U.S. Pat. No. 5,352,254 (Celikkaya) in an amount of 0.1 to 2 percent surface coating to triangular abrasive platelet weight may be used. Such surface coatings are described in U.S. Pat. No. 5,213,591 (Celikkaya et A); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the triangular abrasive platelet from capping. Capping is the term to describe the phenomenon where metal particles from the workpiece being abraded become welded to the tops of the triangular abrasive platelets. Surface coatings to perform the above functions are known to those of skill in the art.

The abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46. ANSI 54. ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10000. According to one embodiment of the present disclosure, the average diameter of the abrasive particles may be within a range of from 260 to 1400 microns in accordance with FEPA grades F60 to F24.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according, to a designated particle size. A typical designation may be represented as −18+20 meaning that the abrasive particles pass through a test sieve meeting ASTM E-11 specifications for the number 18 sieve and are retained on a test sieve meeting ASTM E-11 specifications for the number 20 sieve. In one embodiment, the abrasive particles have a particle size such that most of the particles pass through an 18 mesh test sieve and can be retained on a 20, 25, 30, 35, 40, 45, or 50 mesh test sieve. In various embodiments, the abrasive particles can have a nominal screened grade of: −18+20, −20/+25, −25+40, −40+35, −35+40, 5−40+45, −45+50, −50+60, −60+70, −70/+80, −80+100, −100+120, −120+140, 140+170, −170+200, −200+230, −230+270, −270+325, −325+400, −400+450, −450+500, or −500+635. Alternatively, a custom mesh size can be used such as −90+100.

The spiral pattern can be characterized by its pitch (i.e., the regular separation between lines of the spiral while traveling radially outward from the real or theoretical center of the spiral. In some preferred embodiments, the spiral pitch is an arithmetic spiral having a pitch of from 1.0 to 3 times, more preferably 1.2 to 2.5 times, and even more preferably 1.2 to 2 times the thickness of the triangular abrasive platelets, although this is not a requirement. Likewise, in some preferred embodiments, the regularly-spaced interval is from 1 to 3 times, more preferably from 1.2 to 2 times, and even more preferably 1.2 to 1.5 times the length of the triangular abrasive platelets, although this is not a requirement.

Coated abrasive discs according to the present disclosure can be made by a method in which the triangular abrasive platelets are precisely placed and oriented. The method generally involves the steps of filling the cavities in a production tool each with one or more triangular abrasive platelets (typically one or two), aligning the filled production tool and a make layer precursor-coated backing for transfer of the triangular abrasive platelets to the make layer precursor, transferring the abrasive particles from the cavities onto the make layer precursor-coated backing, and removing the production tool from the aligned position. Thereafter, the make layer precursor is at least partially cured (typically to a sufficient degree that the triangular abrasive platelets are securely adhered to the backing), a size layer precursor is then applied over the make layer precursor and abrasive particles, and at least partially cured to provide the coated abrasive disc. The process, which may be batch or continuous, can be practiced by hand or automated, e.g., using robotic equipment. It is not required to perform all steps or perform them in consecutive order, but they can be performed in the order listed or additional steps performed in between.

The triangular abrasive platelets can be placed in the desired Z-axis rotational orientation formed by first placing them in appropriately shaped cavities in a dispensing surface of a production tool arranged to have a complementary spiral pattern.

Figure 4:
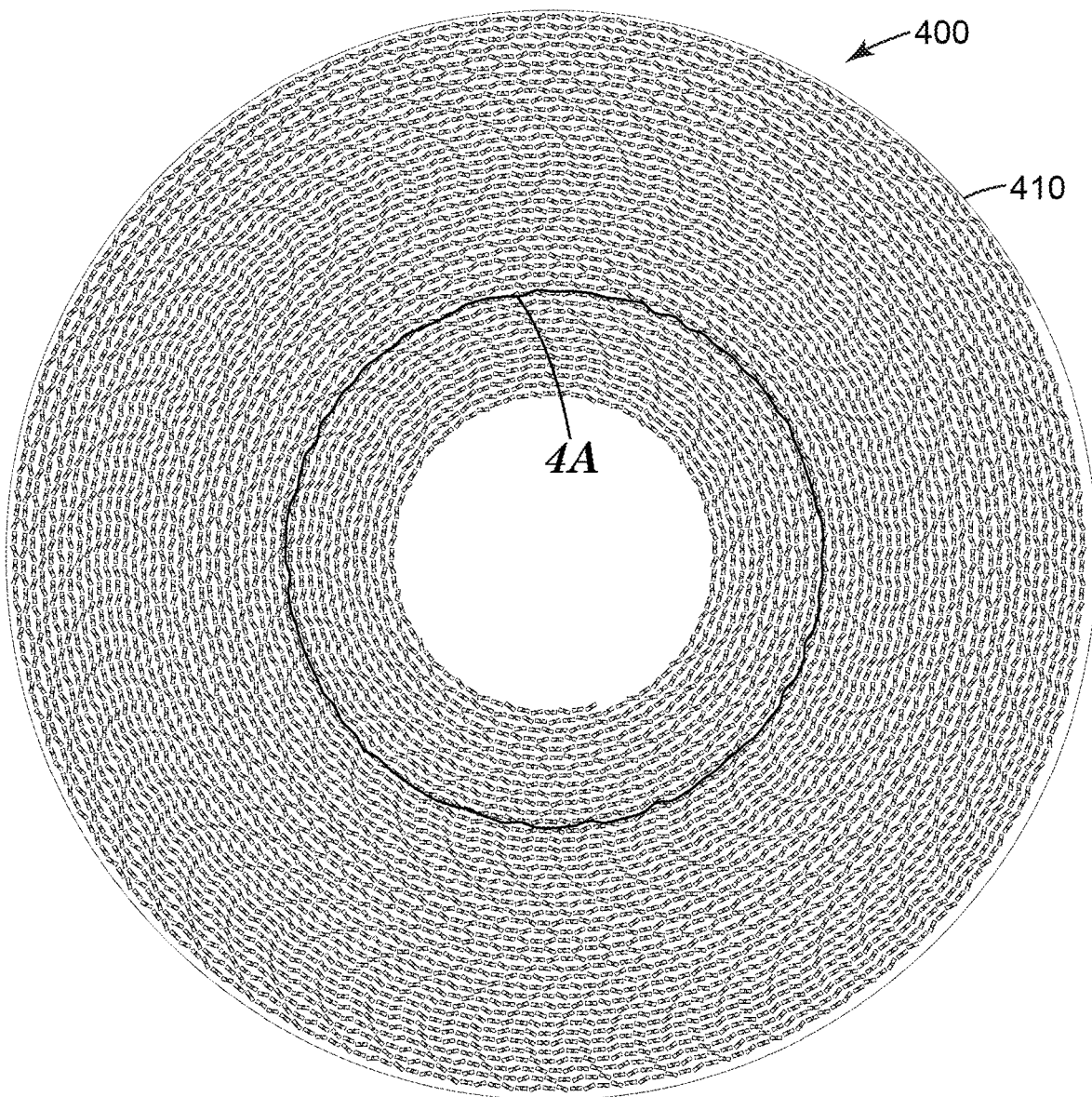
FIG. 4 is a schematic top view of a production tool 400 useful for making coated abrasive disc 100.
Figure 4A:
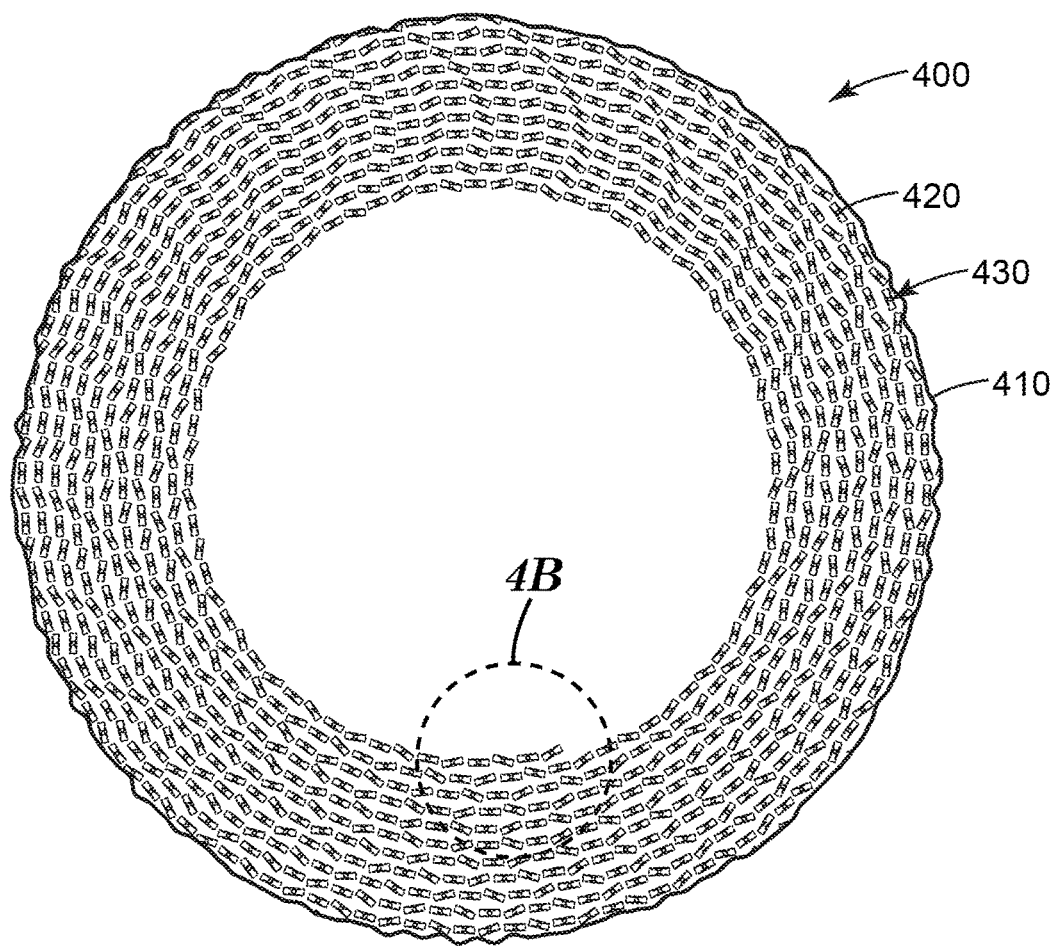
FIG. 4A is an enlarged view of region 4A in FIG. 4.
Figure 4B:
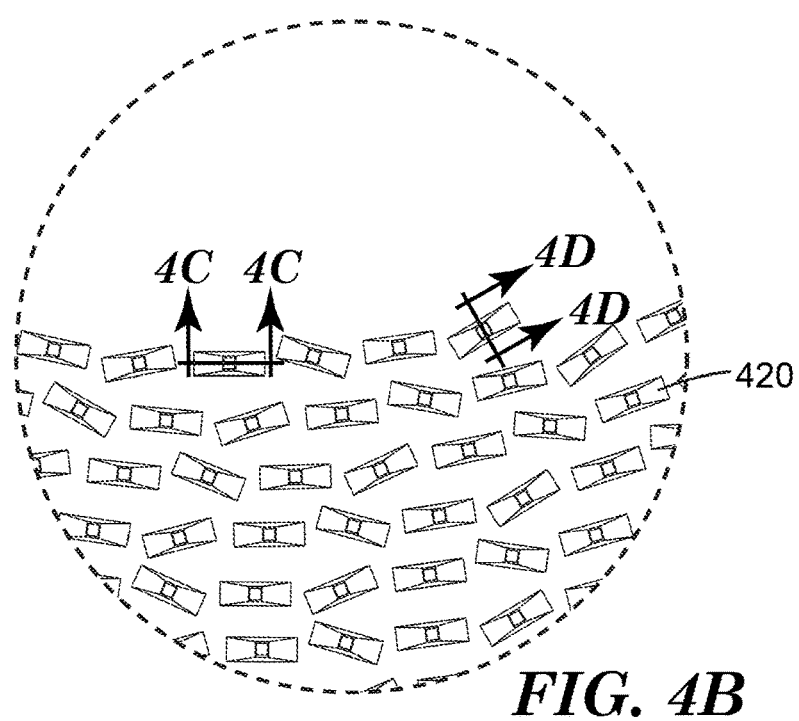
FIG. 4B is and enlarged view of region 4B in FIG. 4A.
Figure 4C:
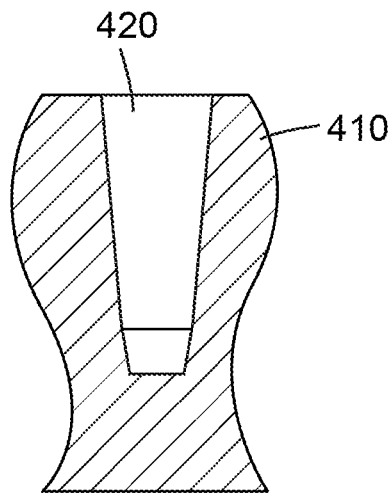
FIG. 4C is an enlarged schematic cross-sectional view of production tool 400 taken along line 4C-4C in FIG. 4B.
Figure 4D:
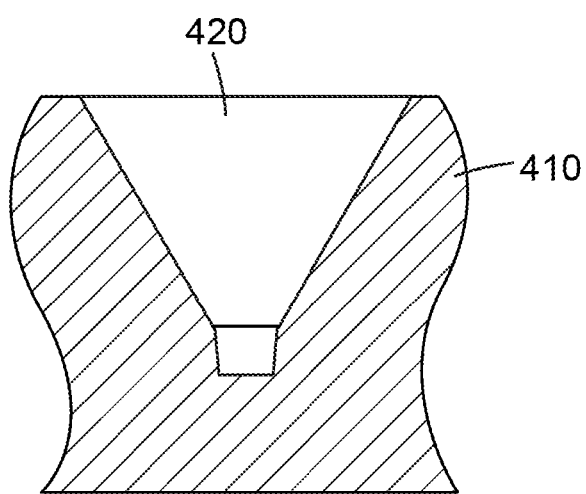
FIG. 4D is an enlarged schematic cross-sectional view of production tool 400 taken along line 4D-4D in FIG. 4B.

An exemplary production tool 400 for making the coated abrasive disc 100 shown in FIGS. 1 and 1A-1C, formed by casting a thermoplastic sheet, is shown in FIG. 4. Referring now to FIG. 4, production tool 400 has a dispensing surface 410 comprising a spiral pattern 430 of cavities 420 sized and shaped to receive the triangular abrasive platelets. Cavities 420 are Z-axis rotationally aligned so that when filled with triangular abrasive platelets that when they are subsequently transferred they form the desired corresponding arithmetic spiral pattern and Z-axis rotational orientation in the resultant coated abrasive disc.

Once most, or all, of the cavities are filled with the desired number of triangular abrasive platelets the dispensing surface is brought into close proximity or contact with the make layer precursor layer on the disc backing thereby embedding and transferring the triangular abrasive platelets from the production tool to the make layer precursor while nominally maintaining horizontal orientation. Of course, some unintended loss of orientation may occur, but it should generally be manageable within the ±10 degree or less tolerance.

In some embodiments, the depth of the cavities in the production tool is selected such that the triangular abrasive platelets fit entirely within the cavities. In some preferred embodiments, the triangular abrasive platelets extend slightly beyond the openings of the cavities. In this way, they can be transferred to the make layer precursor by direct contact with reduced chance of resin transfer to the to the production tool. In some preferred embodiments, the center of mass for each triangular abrasive platelet resides within a respective cavity of the production tool when the triangular abrasive platelet is fully inserted into the cavity. If die depth of the cavities becomes too short, with the triangular abrasive platelet's center of mass being located outside of the cavity, the triangular abrasive platelets are not readily retained within the cavities and may jump back out as the production tool is used in the apparatus.

In order to fill the cavities in the production tool, an excess of the triangular abrasive platelets is preferably applied to the dispensing surface of the production tool such that more triangular abrasive platelets are provided than the number of cavities. An excess of triangular abrasive platelets, which means that there are more triangular abrasive platelets present per unit length of the production tool than cavities present, helps to ensure that most cavities within the production tool are eventually filled with a triangular abrasive platelet as the triangular abrasive platelets accumulate onto the dispensing surface and are moved about either due to gravity or other mechanically applied forces to translate them into a cavity. Since the bearing area and spacing of the abrasive particles is often designed into the production tooling for the specific grinding application, it is generally desirable to not have too much variability in the number of unfilled cavities.

Preferably, a majority of the cavities in the dispensing surface are filled with a triangular abrasive platelet disposed in an individual cavity such that the sides of the cavity and platelet are at least approximately parallel. This can be accomplished by shaping the cavities slightly larger than the triangular abrasive platelets (or multiple thereof). To facilitate filling and release it may be desirable that the cavities have inwardly sloping sidewalls with increasing depth and/ or have vacuum openings at the bottoms of the cavities, wherein the vacuum opening lead to a vacuum source. It is desirable to transfer the triangular abrasive platelets onto the make layer precursor-coated backing such that they stand up or are erectly applied. Therefore, the cavity shape is designed to hold the triangular abrasive platelet erectly.

In various embodiments, at least 60, 70, 80, 90, or 95 percent of the cavities in the dispensing surface contain a triangular abrasive platelet. In some embodiments, gravity can be used to fill the cavities. In other embodiments, the production tool can be inverted and vacuum applied to hold the triangular abrasive platelets in the cavities. The triangular abrasive platelets can be applied by spray, fluidized bed (air or vibration), or electrostatic coating, for example. Removal of excess triangular abrasive platelets would be done by gravity as any abrasive particles not retained would fall back down. The triangular abrasive platelets can thereafter be transferred to the make layer precursor-coated disc backing by removing vacuum.

As mentioned above, excess triangular abrasive platelets may be supplied than cavities such that some will remain on the dispensing surface after the desired number of cavities have been filled. These excess triangular abrasive platelets can often be blown, wiped, or otherwise removed from the dispensing surface. For example, a vacuum or other force could be applied to hold the triangular abrasive platelets in the cavities and the dispensing surface inverted to clear it of the remaining fraction of the excess triangular abrasive platelets.

After substantially all the cavities in the dispensing surface of the production tool are filled with the triangular abrasive platelets, the dispensing surface of the production tool is brought into proximity with the make layer precursor.

In preferred embodiments, the production tool is formed of a thermoplastic polymer such as, for example, polyethylene, polypropylene, polyester, or polycarbonate from a metal master tool. Fabrication methods of production tools, and of master tooling used in their manufacture, can be found in, for example, U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and U.S. Pat. Appl. Publ, Nos. 2013/0344786 A1 (Keipert) and 2016/ 0311084 A1 (Culler et al.).

In some preferred embodiments, the production tool is manufactured using 3-D printing techniques.

Once the triangular abrasive platelets have been embedded in the make layer precursor, it is at least partially cured in order to preserve orientation of the mineral during, application of the size layer precursor. Typically, this involves B-staging the make layer precursor, but more advanced cures may also be used if desired. B-staging may be accomplished, for example, using heat and/or light and/or use of a curative, depending on the nature of the make layer precursor selected.

Next, the size layer precursor is applied over the at least partially cured make layer precursor and triangular abrasive platelets. The size layer can be formed by coating a curable size layer precursor onto a major surface of the backing. The size layer precursor may comprise, for example, glue, phenolic resin, aminoplast resin, urea-formaldehyde resin, melamine-formaldehyde resin, urethane resin, free-radically polymerizable polyfunctional (meth)acrylate (e.g., aminoplast resin having pendant α,β-unsaturated groups, acrylated urethane, acrylated epoxy, acrylated isocyanurate), epoxy resin (including bis-maleimide and fluorene-modified epoxy resins), isocyanurate resin, and mixtures thereof. If phenolic resin is used to form the make layer, it is likewise preferably used to form the size layer. The size layer precursor may be applied by any known coating method for applying a size layer to a backing, including roll coating, extrusion die coating, curtain coating, knife coating, gravure coating, spray coating, and the like. If desired, a presize layer precursor or make layer precursor according to the present disclosure may be also used as the size layer precursor.

The basis weight of the size layer will also necessarily vary depending on the intended use(s), type(s) of abrasive particles, and nature of the coated abrasive disc being prepared, but generally will be in the range of from 1 or 5 gsm to 300, 400, or even 500 gsm, or more. The size layer precursor may be applied by any known coating method for applying a size layer precursor (e.g., a size coat) to a backing including, for example, roll coating, extrusion die coating, curtain coating, and spray coating.

Once applied, the size layer precursor, and typically the partially cured make layer precursor, are sufficiently cured to provide a usable coated abrasive disc. In general, this curing step involves thermal energy, although other forms of energy such as, for example, radiation curing may also be used. Useful forms of thermal energy include, for example, heat and infrared radiation. Exemplary sources of thermal energy include ovens (e.g., festoon ovens), heated rolls, hot air blowers, infrared lamps, and combinations thereof.

In addition to other components, binder precursors, if present, in the make layer precursor and/or presize layer precursor of coated abrasive discs according to the present disclosure may optionally contain catalysts (e.g., thermally activated catalysts or photocatalysts), free-radical initiators (e.g., thermal initiators or photoinitiators), curing agents to facilitate cure. Such catalysts (e.g., thermally activated catalysts or photocatalysts), free-radical initiators (e.g., thermal initiators or photoinitiators), and/or curing agents may be of any type known for use in coated abrasive discs including, for example, those described herein.

In addition to other components, the make and size layer precursors may further contain optional additives, for example, to modify performance and/or appearance. Exemplary additives include grinding, aids, fillers, plasticizers, wetting agents, surfactants, pigments, coupling agents, fibers, lubricants, thixotropic materials, antistatic agents, suspending agents, and/or dyes.

Exemplary grinding aids, which may be organic or inorganic, include waxes, halogenated organic compounds such as chlorinated waxes like tetrachloronaphthalene, pentachloronaphthalene, and polyvinyl chloride; halide salts such as sodium chloride, potassium cryolite, sodium cryolite, ammonium cryolite, potassium tetrafluoroborate, sodium tetrafluoroborate, silicon fluorides, potassium chloride, magnesium chloride; and metals and their alloys such as tin, lead, bismuth, cobalt, antimony, cadmium, iron, and titanium. Examples of other grinding aids include sulfur, organic sulfur compounds, graphite, and metallic sulfides. A combination of different grinding aids can be used.

Exemplary antistatic agents include electrically conductive material such as vanadium pentoxide (e.g., dispersed in a sulfonated polyester), humectants, carbon black and/or graphite in a binder.

Examples of useful fillers for this disclosure include silica such as quartz, glass beads, glass bubbles and glass fibers; silicates such as talc, clays, (montmorillonite) feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite.

Optionally a supersize layer may be applied to at least a portion of the size layer. If present, the supersize typically includes grinding aids and/or anti-loading materials. The optional supersize layer may serve to prevent or reduce the accumulation of swarf (the material abraded from a workpiece) between abrasive particles, which can dramatically reduce the cutting ability of the coated abrasive disc. Useful supersize layers typically include a grinding aid (e.g., potassium tetrafluoroborate), metal salts of fatty acids (e.g., zinc stearate or calcium stearate), salts of phosphate esters (e.g., potassium behenyl phosphate), phosphate esters, urea-formaldehyde resins, mineral oils, crosslinked silanes, crosslinked silicones, and/or fluorochemicals. Useful supersize materials are further described, for example, in U.S. Pat. No. 5,556,437 (Lee et al). Typically, the amount of grinding aid incorporated into coated abrasive products is about 50 to about 400 gsm, more typically about 80 to about 300 gsm. The supersize may contain a binder such as for example, those used to prepare the size or make layer, but it need not have any binder.

Further details concerning coated abrasive articles (e.g., coated abrasive discs) comprising an abrasive layer secured to a fabric backing, wherein the abrasive layer comprises abrasive particles and make, size, and optional supersize layers are well known, and may be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,417,726 (Stout et al.); U.S. Pat. No. 5,436,063 (Follett et al); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954,844 (Law et al.); U.S. Pat. No. 5,961,674 (Gagliardi et al.); U.S. Pat. No. 4,751,138 (Bange et al.); U.S. Pat. No. 5,766,277 (DcVoe et al.); U.S. Pat. No. 6,077,601 (DcVoe et at); U.S. Pat. No. 6,228,133 (Thurber et at); and U.S. Pat. No. 5,975,988 (Christianson).

Coated abrasive discs according to the present disclosure are useful for abrading a workpiece; for example, by off-hand abrading with a handheld right-angle grinder. Preferred workpieces include welding beads (e.g., especially mild steel welds), flash, gates, and risers off castings.

Select Embodiments of the Present Disclosure

In a first aspect, the present disclosure provides a coated abrasive disc comprising:

a disc backing having an outer circumference;

an abrasive layer disposed on the disc backing, wherein the abrasive layer comprises triangular abrasive platelets secured to a major surface of the disc backing by at least one binder material, wherein the triangular abrasive platelets are outwardly disposed at regularly-spaced points along a spiral pattern extending outwardly toward the outer circumference, wherein each one of the triangular abrasive platelets has respective top and bottom surfaces connected to each other, and separated by, three sidewalls, wherein, on a respective basis, one sidewall of at least 90 percent of the triangular abrasive platelets is disposed facing and proximate to the disc backing, and wherein at least 70 percent (preferably at least 80 percent, more preferably at least 90 percent, and more preferably 95 percent) of the triangular abrasive platelets are disposed in a recurring sequential orientation having:

i) a first triangular abrasive platelet with a first respective sidewall facing the disc backing, wherein the Z-axis rotational orientation of the first respective sidewall is longitudinally outwardly oriented at an angle of −10 to −40 degrees relative to the tangent to the spiral pattern at a first one of the regularly-spaced points;

ii) a second triangular abrasive platelet with a second respective sidewall facing the disc backing, wherein the Z-axis rotational orientation of the second respective sidewall is longitudinally outwardly oriented at an angle of −15 to +15 degrees relative to the tangent to the spiral pattern at a second one of the regularly-spaced points;

iii) a third triangular abrasive platelet with a third respective sidewall facing the disc backing, wherein the Z-axis rotational orientation of the third respective sidewall is longitudinally outwardly oriented at an angle of +10 to +40 degrees relative to the tangent to the spiral pattern at a third one of the regularly-spaced points; and iv) a fourth triangular abrasive platelet with a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth one of the regularly-spaced points.

In a second embodiment, wherein the triangular abrasive platelets have an average thickness, wherein the spiral pattern comprises a spiral pattern, and wherein the arithmetic spiral pattern has a pitch that is 1 to 3 times the average thickness of the triangular abrasive platelets.

In a third embodiment, the present disclosure provides a coated abrasive disc according to the first or second embodiment, wherein the abrasive layer further comprises crushed abrasive or non-abrasive particles.

In a fourth embodiment, the present disclosure provides a coated abrasive disc according to any one of the first to third embodiments, wherein the disc backing comprises vulcanized fiber.

In a fifth embodiment, the present disclosure provides a coated abrasive disc according to any one of the first to fourth embodiments, wherein the abrasive layer comprises a make layer and a size layer disposed over the make layer and the triangular abrasive platelets.

In a sixth embodiment, the present disclosure provides a coated abrasive disc according to any one of the first to fifth embodiments, wherein the triangular abrasive platelets comprise alpha alumina.

In a seventh embodiment, the present disclosure provides a method of abrading a workpiece, the method comprising frictionally contacting a portion of the abrasive layer of a coated abrasive disc according to any one of the first to sixth embodiments with the workpiece, and moving at least one of the workpiece and the coated abrasive disc relative to the other to abrade the workpiece.

In an eighth embodiment, the present disclosure provides a method of abrading a workpiece according to the seventh embodiment, wherein the substrate comprises high carbon steel, and wherein the abrasive layer contacts the high carbon steel.

In a ninth embodiment, the present disclosure provides a method of making a coated abrasive disc, the method comprising:

disposing a curable make layer precursor on a major surface of a disc backing;

embedding triangular abrasive platelets into the curable make layer precursor, wherein the triangular abrasive platelets are outwardly disposed at regularly-spaced points along a spiral pattern extending outwardly toward the outer circumference, wherein each one of the triangular abrasive platelets has respective top and bottom surfaces connected to each other, and separated by, three sidewalls, wherein, on a respective basis, one sidewall of at least 90 percent of the triangular abrasive platelets is disposed facing and proximate to the disc backing, and wherein at least 70 percent (preferably at least 80 percent, more preferably at least 90 percent, and more preferably 95 percent) of the triangular abrasive platelets are disposed in a recurring sequential orientation having:

i) a first triangular abrasive platelet with a first respective sidewall facing the disc backing, wherein the Z-axis rotational orientation of the first respective sidewall is longitudinally outwardly oriented at an angle of −10 to −40 degrees relative to the tangent to the spiral pattern at a first one of the regularly-spaced points;

ii) a second triangular abrasive platelet with a second respective sidewall facing the disc backing, wherein the Z-axis rotational orientation of the second respective sidewall is longitudinally outwardly oriented at an angle of −15 to +15 degrees relative to the tangent to the spiral pattern at a second one of the regularly-spaced points;

iii) a third triangular abrasive platelet with a third respective sidewall facing the disc backing, wherein the Z-axis rotational orientation of the third respective sidewall is longitudinally outwardly oriented at an angle of +10 to +40 degrees relative to the tangent to the spiral pattern at a third one of the regularly-spaced points; and iv) a fourth triangular abrasive platelet with a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth one of the regularly-spaced points;

at least partially curing the curable make layer precursor to provide a make layer;

disposing a curable size layer precursor over the make layer and triangular abrasive platelets; and at least partially curing the curable size layer precursor to provide a size layer.

In a tenth embodiment, the present disclosure provides a method according to the ninth embodiment, wherein the triangular abrasive platelets have an average thickness, wherein the spiral pattern comprises a spiral pattern, and wherein the arithmetic spiral pattern has a pitch that is 1 to 3 times the average thickness of the triangular abrasive platelets.

In an eleventh embodiment, the present disclosure provides a method according to the ninth or tenth embodiment, wherein the abrasive layer further comprises crushed abrasive or non-abrasive particles.

In a twelfth embodiment, the present disclosure provides a method according to any one of the ninth to eleventh embodiments, wherein the disc backing comprises vulcanized fiber.

In a thirteenth embodiment, the present disclosure provides a method according to any one of the ninth to twelfth embodiments, wherein the triangular abrasive platelets comprise alpha alumina.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise noted, all reagents were obtained, or are available from chemical vendors such as, for example, Sigma-Aldrich Company, St. Louis, Mo., or may be synthesized by known methods. Abrasive particles used in the Examples are reported in Table 1, below.

TABLE 1

| ABBREVIATION | DESCRIPTION |
|---|---|
| AP1 | Shaped abrasive particles were prepared according to the disclosure of U.S. Pat. No. 8,142,531 (Adefris et al.). The shaped abrasive particles were prepared by molding alumina sol gel in equilateral triangle-shaped polypropylene mold cavities of side length 0.11 inch (2.794 mm) and a mold depth of 0.028 inch (0.711 mm). After drying and firing, the resulting shaped abrasive particles were about 1.4 mm (side length) × 0.35 mm thick, with a draft angle approximately 98 degrees, and would pass through a 20-mesh USA Standard Testing Sieve. |
| AP2 | Natural Almandite garnet conforming the ANSI standard for grade 50, obtained as 50UT from Barton Abrasives, Glen Falls, New York. |

Example 1

A 7-inch (178-mm) circular plastic transfer tool consisting of a continuous arithmetic spiral of triangular cavities, having geometries such as those described in PCT Pat. Publ. No. WO 2015/100018 A1 (Adefris et al.), was prepared by 3-D printing. The spiral extended from the disc edge to within 1 inch (2.54 cm) of the disc center. The spiral pitch was approximately 0.059 inches (1.49 mm). The centers of the cavities were regularly spaced along the length of the spiral at intervals of approximately 0.087 inches (2.21 mm). The angular orientation of the long axis of each cavity relative to the spiral path varied sequentially along the spiral path. The repeat pattern relative to the spiral path was 0 degrees, +45 degrees, 0 degrees, −45 degrees and so on as shown in FIGS. 4 and 4A-4D. The total number of cavities on the tool was approximately 5600. The transfer tool was treated with a molybdenum sulfide spray lubricant (obtained under the trade designation MOLYCOAT from the Dow Corning Corporation, Midland Mich.) to assist abrasive grain release.

An excess of abrasive grain AP1 was applied to the surface of the transfer tool having the cavity openings and the tooling was shaken from side to side by hand. The transfer tooling cavities were soon filled with AP1 grains held in a vertex down and base up orientation and aligned along the cavity long axis. Additional AP1 was applied and the process repeated until greater than 95 percent of the transfer tooling cavities were filled by AP1 grain. Excess grain was removed from the surface of the transfer tool leaving only the grains contained within the cavities.

A make resin was prepared by mixing 49 parts of resole phenolic resin (based-catalyzed condensate from 1.5:1 to 2.1:1 molar ratio of formaldehyde:phenol), 41 parts of calcium carbonate (HUBERCARB, Huber Engineered Materials, Quincy, Ill.) and 10 parts of water. 3.7+/−0.1 grants of make resin was applied via a brush to a 7-inch (17.8-cm) diameter×0.83 mm thick vulcanized fiber web (DYNOS VULCANIZED FIBER, DYNOS GmbH, Troisdoif, Germany) having a 0875-inch (2.22-cm) center hole.

The AP1 filled transfer tool was placed cavity side up on a 7-inch by 7-inch (18-cm×18-cm) square wooden board. The make resin coated surface of the vulcanized fiber disc was brought into contact with the filled transfer tool and another 7-inch by 7-inch (18 cm×18 cm) square wooden board was placed on top. The resulting assembly was inverted while being held in rigid contact and gently tapped to dislodge the AP1 grains from the transfer tool so as to fall base first onto the make resin surface. The vulcanized fiber disc backing was then allowed to fall away from the now substantially grain-free transfer tool resulting in an AP1 coated vulcanized fiber disc replicating the transfer tooling pattern.

A drop-coated filler grain consisting of AP2 was applied in excess to the wet make resin and agitated until the entire exposed make resin surface was filled to capacity with AP2. The disc was inverted to remove excess AP2. The amount of AP2 addition was 15.0+/−0.1 grams.

The make resin was partially cured in an oven by heating for 45 minutes at 70° C., followed by 45 minutes at 90° C., followed by 3 hours at 105° C. The disc was then coated with 11.5+/−0.2 grams of a conventional cryolite-containing phenolic size resin and cured for 45 minutes at 70° C., followed by 45 minutes at 90° C., followed by 16 hours at 105° C. EXAMPLE 1 was used to grind AISI 1018 mild steel using Grinding Test Method A. DISI 1018 mild steel has the composition, on a weight basis: 0.18 percent carbon, 0.6-0.9 percent manganese, 0.04 percent (max) phosphorus, 0.05 percent (max) of sulfur, and 98.81-99.26 percent iron. Grinding performance results are reported in Table 2. The resultant disc had shaped abrasive particles arranged according to the pattern shown in FIG. 1.

Example 2

EXAMPLE 2 was prepared generally by the method of EXAMPLE 1 with the exception as follows. The make resin weight was 3.7+1-0.1 grams. AP2 drop coated secondary grain was used in the amount of 16.3+/−0.2 grams. Size resin weight was 11.9+/−0.2 grams. The final 105° C. size cure sequence was reduced from 16 to 3 hours after which an additional $KBF_4$ supersize coating was applied at a weight of 9.4 grams. Final cure was 45 minutes at 70° C., followed by 45 minutes at 90° C., followed by 12 hours at 105° C. EXAMPLE 2 was used to grind 304 stainless steel using Grinding Test Method B. Grinding performance results are reported in Table 3.

Comparative Example A

COMPARATIVE EXAMPLE A was prepared generally by the method of EXAMPLE 1 with the exception that the cavities of the circular plastic transfer tool had all cavity long axes at zero degrees deviation relative to the spiral path, lacking the sequential change in orientation of the EXAMPLE 1 transfer tool. The cavity dimensions, pitch, spacing and total number of cavities was otherwise identical to the transfer tool of EXAMPLE 1. COMPARATIVE EXAMPLE A was used to grind 1018 mild steel using Grinding Test Method A. Grinding performance results are reported in Table 2.

Comparative Example B

COMPARATIVE EXAMPLE B was prepared generally by the method of COMPARATIVE EXAMPLE A with the exception as follows. The make resin weight was 3.7+/−0.1 grams. AP2 drop coated secondary grain was used in the amount of 15.3+/−0.2 grams. Size resin weight was 11.7+/−0.1 grams. The final 105° C. size cure sequence was reduced from 16 to 3 hours after which an additional $KBF_4$ supersize coating was applied at a weight of 9.5 grams. Final cure was 45 minutes at 70° C., followed by 45 minutes at 90° C., followed by 12 hours at 0.5° C. COMPARATIVE EXAMPLE B was used to grind 304 stainless steel using, Grinding Test Method B. Grinding performance results are reported in Table 3.

Grinding Test
Method A

The grinding performance of the various discs was evaluated by grinding 1018 mild carbon steel using the following procedure. Seven-inch (17.8 cm) diameter abrasive disks for evaluation were attached to a drive motor running at a constant rotational speed of 5000 rpm and fitted with a 7-inch (17.8 cm) ribbed disc pad face plate (051144 EXTRA HARD RED RIBBED, obtained from 3M Company). The grinder was activated and urged against an end face of a 1×1 in (2.54×2.54 cm) pre-weighed 1018 steel bar under a controlled force. The workpiece was abraded under these conditions for 13-second grinding intervals (passes). Following each 13-second interval, the workpiece was cooled to room temperature and weighed to determine the cut of the abrasive operation. The test end point was determined when the cut fell below 15 grams per cycle. Test results were reported as the incremental cut (g/cycle) for each interval and the total stock removed (g).

Method B

The grinding performance of die various discs was evaluated by grinding 304 stainless steel using the following procedure. Seven-inch (17.8-cm) diameter abrasive disks for evaluation were attached to a drive motor running at a constant rotational speed of 5000 rpm and fitted with a 7-inch (17.8 cm) ribbed disc pad face plate (051144 EXTRA HARD RED RIBBED, obtained from 3M Company). The grinder was activated and urged against an end face of a 1×1 in (2.54×2.54 cm) pre-weighed 304 stainless steel bar under a controlled force. The workpiece was abraded under these conditions for 13-second grinding intervals (passes). Following each 13-second interval, the workpiece was cooled to room temperature and weighed to determine the cut of the abrasive operation. The test end point was determined when the cut fell below 10 grams per cycle. Test results were reported as the incremental cut (g/cycle) for each interval and the total stock removed (g).

Results reported in Table 2 (below) were obtained according to the Grinding Test, Method A.

TABLE 2

| | GRINDING TEST, METHOD A INCREMENTAL CUT, grams | | | |
|---|---|---|---|---|
| | EXAMPLE 1 | | COMPARATIVE EXAMPLE A | |
| CYCLE | SPECIMEN 1 | SPECIMEN 2 | SPECIMEN 1 | SPECIMEN 2 |
| 1 | 31.6 | 31.83 | 31.69 | 31.45 |
| 2 | 38.08 | 39.98 | 37.67 | 39.26 |
| 3 | 35.36 | 34.84 | 34.57 | 34.82 |
| 4 | 34.75 | 33.85 | 31.46 | 32.62 |
| 5 | 34.38 | 32.61 | 32.35 | 31.8 |
| 6 | 34.05 | 32.03 | 31.79 | 31.36 |
| 7 | 33.47 | 32.21 | 31.61 | 30.55 |
| 8 | 32.21 | 31.63 | 31.19 | 30.39 |
| 9 | 32.38 | 31.63 | 30.38 | 29.8 |
| 10 | 32.16 | 30.54 | 29.82 | 29.4 |
| 11 | 32.15 | 29.75 | 30.01 | 29.29 |
| 12 | 31.24 | 29.32 | 29.95 | 28.86 |
| 13 | 31.95 | 29.21 | 29.58 | 28.39 |
| 14 | 31.38 | 29.39 | 29.08 | 28.41 |
| 15 | 30.63 | 28.4 | 29.04 | 27.91 |
| 16 | 29.64 | 28.14 | 29.63 | 26.65 |
| 17 | 30.11 | 28.08 | 29.17 | 26.72 |
| 18 | 30.11 | 28.17 | 29.49 | 27.01 |
| 19 | 28.67 | 27.78 | 29.08 | 27.18 |
| 20 | 29.58 | 27.23 | 28.82 | 27.09 |
| 21 | 28.94 | 27.06 | 28.73 | 26.3 |
| 22 | 28.97 | 26.47 | 28.31 | 27.06 |
| 23 | 28.67 | 26.2 | 27.99 | 26.32 |
| 24 | 28.01 | 26.06 | 27.77 | 25.98 |
| 25 | 27.75 | 26.21 | 27.6 | 25.98 |
| 26 | 27.39 | 25.93 | 27.74 | 25.4 |
| 27 | 27.07 | 25.35 | 27.52 | 25.59 |
| 28 | 27.14 | 24.29 | 27.43 | 25.4 |
| 29 | 26.51 | 24.9 | 27.07 | 25.3 |
| 30 | 25.06 | 24.61 | 27.47 | 25.1 |
| 31 | 25.66 | 24.81 | 26.51 | 24.83 |
| 32 | 25.42 | 24.33 | 26.35 | 24.63 |
| 33 | 26.09 | 23.62 | 24.5 | 24.32 |
| 34 | 25.52 | 23.92 | 25.38 | 24.18 |
| 35 | 25.58 | 23.7 | 25.32 | 23.6 |
| 36 | 25.24 | 23.49 | 25.43 | 23.75 |
| 37 | 24.92 | 23.25 | 25.09 | 23.2 |
| 38 | 24.64 | 23.3 | 25.25 | 23.21 |

TABLE 2-continued

| | GRINDING TEST, METHOD A INCREMENTAL CUT, grams | | | |
|---|---|---|---|---|
| | EXAMPLE 1 | | COMPARATIVE EXAMPLE A | |
| CYCLE | SPECIMEN 1 | SPECIMEN 2 | SPECIMEN 1 | SPECIMEN 2 |
| 39 | 24.69 | 22.18 | 25.25 | 23.02 |
| 40 | 24.46 | 22.19 | 24.79 | 22.62 |
| 41 | 23.99 | 21.78 | 24.08 | 22.62 |
| 42 | 24.22 | 21.74 | 24.26 | 22.38 |
| 43 | 23.93 | 22.03 | 23.86 | 22.58 |
| 44 | 23.66 | 21.57 | 23.91 | 22.14 |
| 45 | 23.56 | 21.52 | 23.68 | 22.04 |
| 46 | 23.2 | 21.35 | 23.6 | 21.78 |
| 47 | 23.48 | 21.11 | 23.28 | 21.75 |
| 48 | 23.09 | 20.89 | 23.16 | 21.79 |
| 49 | 23.04 | 20.95 | 23.06 | 21.51 |
| 50 | 23.15 | 20.74 | 22.49 | 21.36 |
| 51 | 23.04 | 20.52 | 23.14 | 21.04 |
| 52 | 22.48 | 20.25 | 22.88 | 21.25 |
| 53 | 22.55 | 20.18 | 22.75 | 21.1 |
| 54 | 22.24 | 20.11 | 22.45 | 20.84 |
| 55 | 22.1 | 19.56 | 21.8 | 20.75 |
| 56 | 21.66 | 20.09 | 21.81 | 20.76 |
| 57 | 21.32 | 19.98 | 22.18 | 20.21 |
| 58 | 21.52 | 19.6 | 21.68 | 20.61 |
| 59 | 21.3 | 19.53 | 21.44 | 20.21 |
| 60 | 21.42 | 19.41 | 21.53 | 19.87 |
| 61 | 21.22 | 19.04 | 21.42 | 19.63 |
| 62 | 21.22 | 18.81 | 21.31 | 19.79 |
| 63 | 20.92 | 18.9 | 21.3 | 19.56 |
| 64 | 20.64 | 18.42 | 21.51 | 19.35 |
| 65 | 20.7 | 18.37 | 21.15 | 19.52 |
| 66 | 20.63 | 18.23 | 20.55 | 19.38 |
| 67 | 20.51 | 18.01 | 20.84 | 19.27 |
| 68 | 20.37 | 17.91 | 20.97 | 19.24 |
| 69 | 20.06 | 18.16 | 20.78 | 19.05 |
| 70 | 19.82 | 17.73 | 20.49 | 18.98 |
| 71 | 19.91 | 18.02 | 20.11 | 18.96 |
| 72 | 19.7 | 17.57 | 20.12 | 18.77 |
| 73 | 19.77 | 17.65 | 20.07 | 18.43 |
| 74 | 20.05 | 17.6 | 19.8 | 18.49 |
| 75 | 19.8 | 17.35 | 19.8 | 18.22 |
| 76 | 19.34 | 17.2 | 19.83 | 18.19 |
| 77 | 19.26 | 17.06 | 19.48 | 17.98 |
| 78 | 19.31 | 16.91 | 19.61 | 17.78 |
| 79 | 18.97 | 16.56 | 19.23 | 17.96 |
| 80 | 18.63 | 16.64 | 19.28 | 17.79 |
| 81 | 18.39 | 16.5 | 19.09 | 17.66 |
| 82 | 18.26 | 16.74 | 18.8 | 17.45 |
| 83 | 18.58 | 16.44 | 18.62 | 17.37 |
| 84 | 18.52 | 16.3 | 18.24 | 17.38 |
| 85 | 18.15 | 15.96 | 18.29 | 17.1 |
| 86 | 18.3 | 16.25 | 18.12 | 16.74 |
| 87 | 17.95 | 15.86 | 17.77 | 16.83 |
| 88 | 18.27 | 15.78 | 18.28 | 16.86 |
| 89 | 18.09 | 15.74 | 18.2 | 16.64 |
| 90 | 17.9 | 15.36 | 17.8 | 16.33 |
| 91 | 17.58 | 15.43 | 17.64 | 16.58 |
| 92 | 17.44 | 15.37 | 17.45 | 16.27 |
| 93 | 17.35 | 15.14 | 17.38 | 16.36 |
| 94 | 17.4 | 15.12 | 17.49 | 16.03 |
| 95 | 17.35 | 15.16 | 17.32 | 15.96 |
| 96 | 17.22 | 15.02 | 17.24 | 15.97 |
| 97 | 17.01 | 15.1 | 17.27 | 15.74 |
| 98 | 16.93 | 14.89 | 16.93 | 15.84 |
| 99 | 17.14 | | 16.97 | 15.57 |
| 100 | 16.67 | | 16.68 | 15.48 |
| 101 | 16.87 | | 16.51 | 15.21 |
| 102 | 16.35 | | 16.64 | 15.17 |
| 103 | 16.68 | | 16.24 | 15.07 |
| 104 | 16.4 | | 16.41 | 14.82 |
| 105 | 16.62 | | 16 | |
| 106 | 16.43 | | 16.09 | |
| 107 | 16.28 | | 16.13 | |
| 108 | 16.24 | | 15.75 | |
| 109 | 16.04 | | 15.48 | |
| 110 | 16.11 | | 15.49 | |
| 111 | 16.08 | | 15.58 | |

TABLE 2-continued

GRINDING TEST, METHOD A
INCREMENTAL CUT, grams

| | EXAMPLE 1 | | COMPARATIVE EXAMPLE A | |
|---|---|---|---|---|
| CYCLE | SPECIMEN 1 | SPECIMEN 2 | SPECIMEN 1 | SPECIMEN 2 |
| 112 | 15.98 | | 15.36 | |
| 113 | 15.9 | | 15.28 | |
| 114 | 15.78 | | 15.37 | |
| 115 | 15.69 | | 15.16 | |
| 116 | 15.51 | | 15.2 | |
| 117 | 15.6 | | 14.83 | |
| 118 | 15.41 | | | |
| 119 | 15.46 | | | |
| 120 | 15.41 | | | |
| 121 | 15.29 | | | |
| 122 | 15.22 | | | |
| 123 | 14.9 | | | |
| total cut | 2748 | 2160 | 2636 | 2288 |

Results reported in Table 3 (below) were obtained according to the Grinding Test, Method B.

TABLE 3

GRINDING TEST, METHOD B
INCREMENTAL CUT, grams

| | EXAMPLE 2 | | COMPARATIVE EXAMPLE B | |
|---|---|---|---|---|
| CYCLE | SPECIMEN 1 | SPECIMEN 2 | SPECIMEN 1 | SPECIMEN 2 |
| 1 | 31.91 | 33.98 | 34.46 | 35.09 |
| 2 | 33.28 | 34.06 | 34.12 | 33.92 |
| 3 | 29.81 | 30.69 | 28.97 | 29.79 |
| 4 | 26.35 | 26.52 | 25.73 | 25.6 |
| 5 | 22.18 | 22.42 | 22.27 | 21.9 |
| 6 | 20.45 | 20.31 | 19.16 | 20.22 |
| 7 | 19.65 | 20.07 | 18.51 | 19.96 |
| 8 | 18.81 | 19.46 | 18.73 | 20.39 |
| 9 | 19.45 | 19.74 | 18.13 | 19.29 |
| 10 | 19.65 | 20.33 | 17.57 | 18.83 |
| 11 | 19.49 | 18.7 | 17.66 | 18.87 |
| 12 | 18.14 | 18.76 | 16.38 | 18.33 |
| 13 | 17.81 | 18.7 | 15.8 | 16.57 |
| 14 | 16.05 | 17.76 | 14.91 | 15.47 |
| 15 | 15.67 | 16.25 | 13.06 | 15.07 |
| 16 | 14.56 | 14.82 | 12.22 | 13.95 |
| 17 | 14.16 | 14.07 | 11.27 | 13.1 |
| 18 | 13.2 | 12.62 | 10 | 12.05 |
| 19 | 12.1 | 12.35 | 8.57 | 10.88 |
| 20 | 10.92 | 11.43 | | 9.74 |
| 21 | 10.19 | 9.9 | | |
| 22 | 8.99 | | | |
| total cut | 413 | 413 | 358 | 389 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A coated abrasive disc comprising:
   a disc backing having an outer circumference;
   an abrasive layer disposed on the disc backing, wherein the abrasive layer comprises triangular abrasive platelets secured to a major surface of the disc backing by at least one binder material, wherein the triangular abrasive platelets are outwardly disposed at regularly-spaced points along a spiral pattern extending outwardly toward the outer circumference,
   wherein each one of the triangular abrasive platelets has respective top and bottom surfaces connected to each other, and separated by, three sidewalls,
   wherein, on a respective basis, one sidewall of at least 90 percent of the triangular abrasive platelets is disposed facing and proximate to the disc backing, and
   wherein at least 70 percent of the triangular abrasive platelets are disposed in a recurring sequential orientation having:

i) a first triangular abrasive platelet with a first respective sidewall facing the disc backing, wherein the Z-axis rotational orientation of the first respective sidewall is longitudinally outwardly oriented at an angle of −10 to −40 degrees relative to the tangent to the spiral pattern at a first one of the regularly-spaced points;

ii) a second triangular abrasive platelet with a second respective sidewall facing the disc backing, wherein the Z-axis rotational orientation of the second respective sidewall is longitudinally outwardly oriented at an angle of −15 to +15 degrees relative to the tangent to the spiral pattern at a second one of the regularly-spaced points;

iii) a third triangular abrasive platelet with a third respective sidewall facing the disc backing, wherein the Z-axis rotational orientation of the third respective sidewall is longitudinally outwardly oriented at an angle of +10 to +40 degrees relative to the tangent to the spiral pattern at a third one of the regularly-spaced points; and iv) a fourth triangular abrasive platelet with a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth one of the regularly-spaced points.

2. The abrasive disc of claim 1, wherein the triangular abrasive platelets have an average thickness, wherein the spiral pattern comprises an arithmetic spiral pattern, and wherein the arithmetic spiral pattern has a pitch that is 1 to 3 times the average thickness of the triangular abrasive platelets.

3. The abrasive disc of claim 1, wherein the abrasive layer further comprises crushed abrasive or non-abrasive particles.

4. The abrasive disc of claim 1, wherein the disc backing comprises vulcanized fiber.

5. The abrasive disc of claim 1, wherein the abrasive layer comprises a make layer and a size layer disposed over the make layer and the triangular abrasive platelets.

6. The abrasive disc of claim 1, wherein the triangular abrasive platelets comprise alpha alumina.

7. A method of abrading, the method comprising frictionally contacting a portion of the abrasive layer of a coated abrasive disc according to claim 1 with a substrate, and moving at least one of the substrate and the abrasive disc relative to the other to abrade the substrate.

8. The method of claim 7, wherein the substrate comprises carbon steel, and wherein the abrasive layer contacts the carbon steel.

9. A method of making a coated abrasive disc, the method comprising:
disposing a curable make layer precursor on a major surface of a disc backing;
embedding triangular abrasive platelets into the curable make layer precursor, wherein the triangular abrasive platelets are outwardly disposed at regularly-spaced points along a spiral pattern extending outwardly toward the outer circumference,
wherein each one of the triangular abrasive platelets has respective top and bottom surfaces connected to each other, and separated by, three sidewalls,
wherein, on a respective basis, one sidewall of at least 90 percent of the triangular abrasive platelets is disposed facing and proximate to the disc backing, and
wherein at least 70 percent of the triangular abrasive platelets are disposed in a recurring sequential orientation having:

i) a first triangular abrasive platelet with a first respective sidewall facing the disc backing, wherein the Z-axis rotational orientation of the first respective sidewall is longitudinally outwardly oriented at an angle of −10 to −40 degrees relative to the tangent to the spiral pattern at a first one of the regularly-spaced points;

ii) a second triangular abrasive platelet with a second respective sidewall facing the disc backing, wherein the Z-axis rotational orientation of the second respective sidewall is longitudinally outwardly oriented at an angle of −15 to +15 degrees relative to the tangent to the spiral pattern at a second one of the regularly-spaced points;

iii) a third triangular abrasive platelet with a third respective sidewall facing the disc backing, wherein the Z-axis rotational orientation of the third respective sidewall is longitudinally outwardly oriented at an angle of +10 to +40 degrees relative to the tangent to the spiral pattern at a third one of the regularly-spaced points; and iv) a fourth triangular abrasive platelet with a fourth respective sidewall facing the disc backing, wherein the Z-axis rotational orientation of the fourth respective sidewall is longitudinally outwardly oriented at an angle of −15 to +15 degrees relative to the tangent to the spiral pattern at a fourth one of the regularly-spaced points;

at least partially curing the curable make layer precursor to provide a make layer;
disposing a curable size layer precursor over the make layer and triangular abrasive platelets; and
at least partially curing the curable size layer precursor to provide a size layer.

10. The method of claim 9, wherein the triangular abrasive platelets have an average thickness, wherein the spiral pattern comprises an arithmetic spiral pattern, and wherein the arithmetic spiral pattern has a pitch that is 1 to 3 times the average thickness of the triangular abrasive platelets.

11. The method of claim 9, wherein the abrasive layer further comprises crushed abrasive or non-abrasive particles.

12. The method of claim 9, wherein the disc backing comprises vulcanized fiber.

13. The method of claim 9, wherein the triangular abrasive platelets comprise alpha alumina.

* * * * *